(12) United States Patent
Warke et al.

(10) Patent No.: US 7,184,472 B2
(45) Date of Patent: Feb. 27, 2007

(54) TIME DOMAIN EQUALIZER AND METHOD

(75) Inventors: Nirmal C. Warke, Irving, TX (US); Arthur J. Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 761 days.

(21) Appl. No.: 10/384,467

(22) Filed: Mar. 7, 2003

(65) Prior Publication Data

US 2004/0174932 A1     Sep. 9, 2004

(51) Int. Cl.
    *H03H 7/30*  (2006.01)
(52) U.S. Cl. .................................................... 375/229
(58) Field of Classification Search ................ 375/229, 375/231
    See application file for complete search history.

(56) References Cited

U.S. PATENT DOCUMENTS

| 6,473,438 | B1 | 10/2002 | Cioffi et al. |
| 6,577,690 | B1* | 6/2003 | Barman et al. ............ 375/354 |
| 2002/0090008 | A1 | 7/2002 | Cioffi et al. |
| 2002/0166124 | A1* | 11/2002 | Gurantz et al. ............ 725/78 |
| 2004/0264559 | A1 | 12/2004 | Cendrillon et al. |

OTHER PUBLICATIONS

Al-Dhahir, Naofal et al; Optimum Finite-Length Equalization for Multicarrier Transceivers; IEEE Transactions on Communications, vol. 44, No. 1, Jan. 1996; pp. 56-64.

Arslan, Guner et al; Equalization for Discrete Multitone Transceivers to Maximize Bit Rate; IEEE Transactions on Signal Processing, vol. 49, No. 12, Dec. 2001; pp. 3123-3135.

Chow, Jacky S. et al; A Cost-Effective Maximum Likelihood Receiver for Multicarrier Systems; 1992 IEEE; pp. 948-952.

Melsa, Peter J. W. et al.; Impulse Response Shortening for Discrete Multitone Transceivers; IEEE Transactions on Communications, vol. 44, No. 12, Dec. 1996; pp. 1662-1672.

Van Acker, K. et al.; Per Tone Echo Cancellation for DMT-Based Systems; 2001 IEEE; pp. 2365-2368.

Van Acker, Katleen et al.; RLS-Based Initialization for Per-Tone Equalizers in DMT Receivers; IEEE Transactions on Communications, vol. 51, No. 6, Jun. 2003; pp. 885-889.

Van Acker, Katleen et al.; Per Tone Equalization for DMT-Based Systems; IEEE Transactions on Communications, vol. 49, No. 1, Jan. 2001; pp. 109-119.

Van Acker, Katleen et al; Per-Tone Echo Cancellation for DMT-Based Systems; IEEE Transactions on Communications, vol. 51, No. 9, Sep. 2003; pp. 1582-1590.

Van Acker, Katleen et al.; Per Tone Equalization for DMT Receivers; Global Telecommunications Conference—Globecom '99; pp. 2311-2315.

* cited by examiner

*Primary Examiner*—Kevin Kim
(74) *Attorney, Agent, or Firm*—Steven A. Shaw; W. James Brady; Frederick J. Telecky, Jr.

(57) ABSTRACT

Time domain equalizer determination for discrete multitone systems by tone error minimization from a starting point of a single-tone equalizer.

10 Claims, 3 Drawing Sheets

(flow diagram)

Figure 1 (flow diagram)

TIME DOMAIN EQUALIZER AND METHOD

BACKGROUND OF THE INVENTION

The invention relates to electronic devices, and, more particularly, to equalization in multi-tone receivers and corresponding circuitry and methods.

Digital subscriber line (DSL) technologies provide potentially large bandwidth (e.g., up to 20 MHz for subscribers close to the central office) for digital communication over existing telephone subscriber lines (the copper plant). The subscriber lines can provide this bandwidth despite their original design for only voice band (0–4 kHz) analog communication. In particular, ADSL (asymmetric DSL) adapts to the characteristics of the subscriber line by using a discrete multi-tone (DMT) line code with the number of bits per tone (sub-carrier) adjusted to channel conditions. The bits of a codeword are allocated among the sub-carriers for modulation to form an ADSL symbol for transmission. FIG. 2 illustrates the use of the Fast Fourier transform in the system having, for example, 256 tones with each tone treated as a QAM channel (except dc tone 0) and so the kth tone encoding corresponds with a complex number X(k); $0 \leq k \leq 255$. Extending to 512 tones by conjugate symmetry allows the 512-point IFFT to yield real samples x(n), $0 \leq n \leq 511$, of the transformed block (symbol); and a DAC converts these samples into a segment of the transmitted waveform x(t).

The non-ideal impulse response of the transmission channel leads to interference of successive symbols (blocks), so each symbol is extended with a (discardable) cyclic prefix to allow for simplified equalization when the channel memory is less than or equal to the cyclic prefix length. For example, with a cyclic prefix of length 32 and symbol size 512 there are 544 samples transmitted; namely, x(480), x(481), ..., x(510), x(511), x(0), x(1) ..., x(479), x(480), ..., x(510), x(511). Because the cyclic prefix contains duplicative information, shorter cyclic prefixes increase the overall transmission bit rate. Hence, various methods to shorten the effective channel impulse response with a time domain equalizer (TEQ) and thus maximize transmission bit rate have been proposed. For example, Arslan et al, Equalization for Discrete Multitone Transceivers to Maximize Bit Rate, 49 IEEE Tr. Sig. Proc. 1123 (2001) design a TEQ by minimizing the sum of the intersymbol interference power plus noise power for a given signal power. Nevertheless, these methods do not guarantee a TEQ that will be close to optimal in terms of maximizing the overall data rate and minimizing computational intensity.

In another approach, van Acker et al, Per Tone Equalization for DMT-Based Systems, 49 IEEE Tr. Comm. 109 (2001) translate the TEQ into frequency domain equalizers (FEQs), one FEQ for each tone; this allows optimization within each tone separately. But for systems with a large number of tones, such as ADSL with 256 tones, this becomes computationally burdensome.

SUMMARY OF THE INVENTION

The present invention provides time domain equalizer (TEQ) design methods for multitone systems and a single-tone TEQ starting point. This allows for the rapid determination of the optimal TEQ during modem training for the multitone system.

DETAILED DESCRIPTION OF THE PREFERRED EMBODIMENTS

1. Overview

Figure 1:
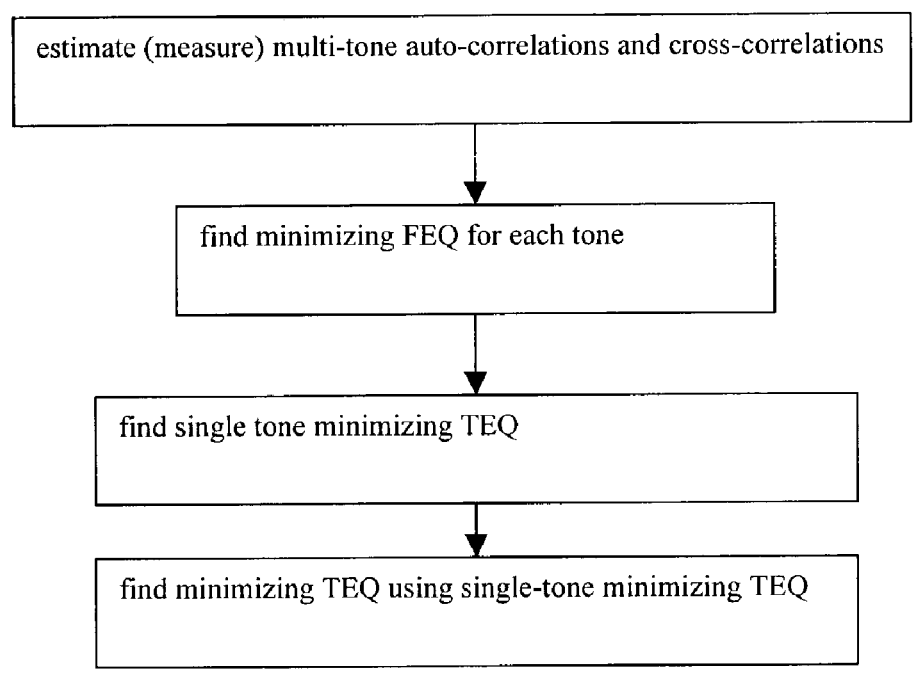
FIG. 1 is a flow diagram for a preferred embodiment method.
Figure 2:
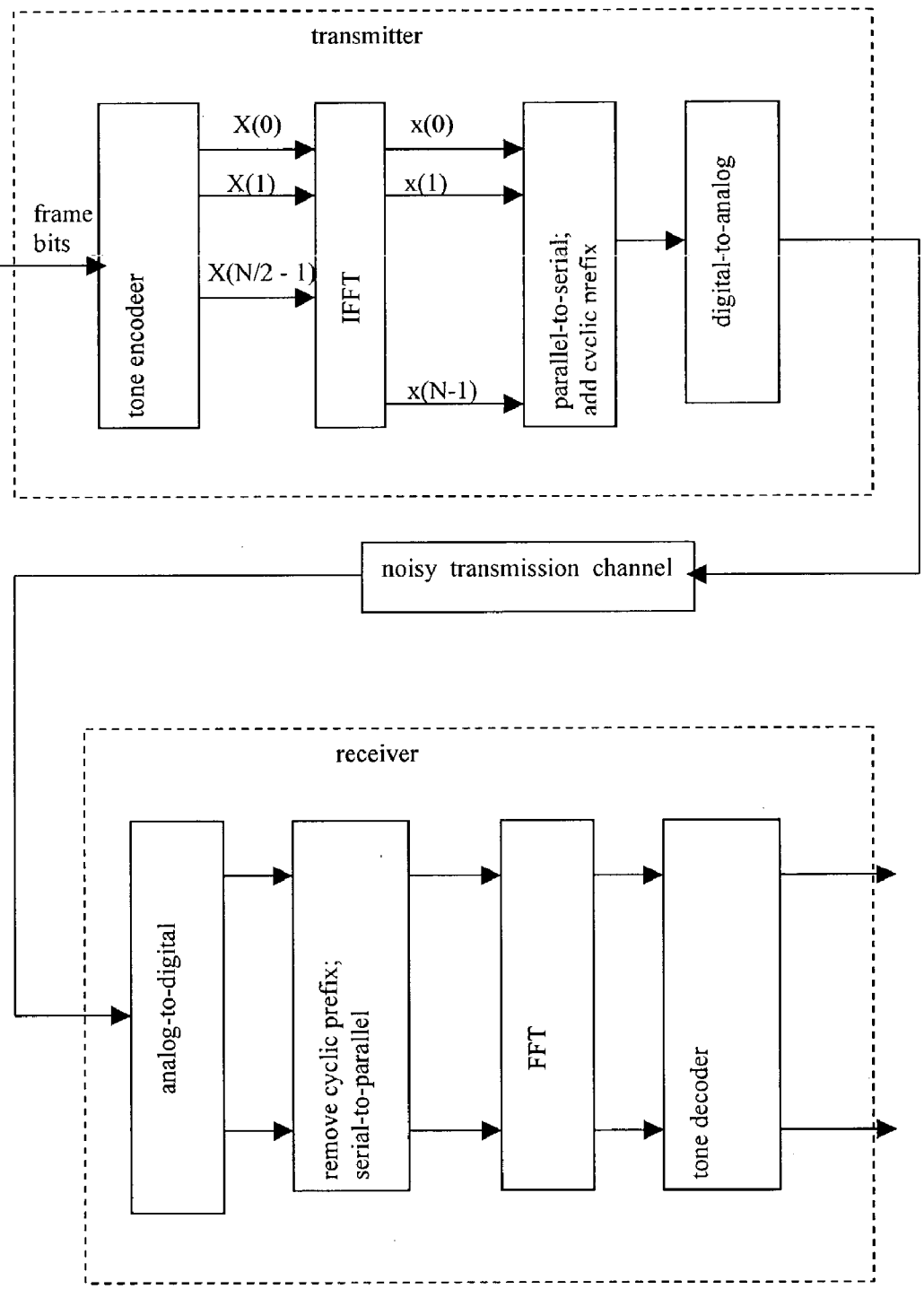
FIG. 2 shows functional blocks of a mutltone system.
Figure 3:
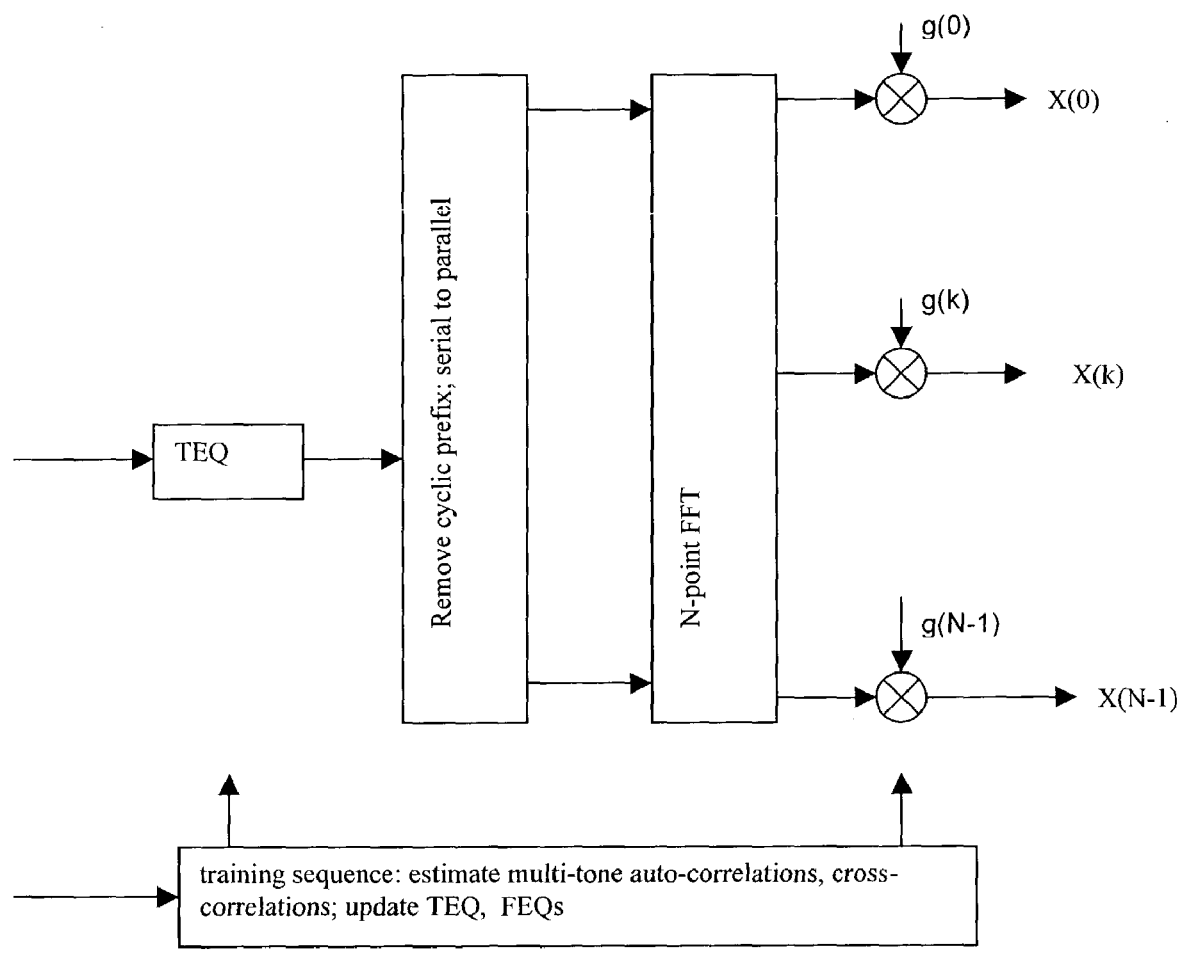
FIG. 3 illustrates a multitone receiver.

The preferred embodiment methods provide a time domain equalizer (TEQ) for discrete multitone (DMT) communication systems by maximizing the overall communication bit rate. FIG. 1 is a flow diagram for first preferred embodiment methods, and FIGS. 2–3 illustrate heuristic functional blocks of corresponding DMT systems. The receiver of FIG. 3 has a single input TEQ (to effectively shorten the transmission channel impulse response) together with a 1-tap (multiplier) frequency domain equalizer (FEQ) for each tone.

The preferred embodiment TEQ methods maximize the overall bit rate by minimizing the product of the mean square errors of the tones being used; and the minimization method starting point is taken as an explicit TEQ design for a single-tone system. The preferred embodiment methods can be used to set TEQ tap weights (coefficients) during training sessions in a multitone communications system. The minimization method may be an approximation method and need not find an exact global minimum.

Preferred embodiment communications systems use preferred embodiment methods. In preferred embodiment communications systems customer premises modems and central office modems could each include one or more digital signal processors (DSPs) and/or other programmable devices with stored programs for performance of the signal processing of the preferred embodiment methods. Alternatively, specialized circuitry could be used. The modems may also contain analog integrated circuits for amplification of inputs to or outputs and conversion between analog and digital; and these analog and processor circuits may be integrated as a system on a chip (SoC). The stored programs may, for example, be in ROM or flash EEPROM integrated with the processor or external. Exemplary DSP cores could be in the TMS320C6xxx or TMS320C5xxx families from Texas Instruments.

The preferred embodiment methods include complex TEQ by optimization (section 2), real TEQ by optimization (section 3), complex TEQ by gradient analysis (section 4), real TEQ by gradient analysis (section 5), and single-tone TEQs for starting points in the preceding methods (section 6).

2. Complex TEQ Optimization Preferred Embodiments

FIG. 1 is a flow diagram for a first preferred embodiment method for the time domain equalizer (TEQ) and frequency domain equalizers (FEQs) in a discrete multitone (DMT) receiver as heuristically illustrated in FIG. 3. In particular, the method takes as inputs the number of tones (N) which is also the number of samples constituting a symbol, the cyclic prefix length (P), and the number of taps for the TEQ (L+1), plus measured signal-to-noise ratios (SNRs) of the tones and correlations of known transmitted and received signals (as would be determined during a training session). The method outputs the tap weights, w(j) for $0 \leq j \leq L$, of the TEQ plus for each tone k a complex multiplier, g(k), (the 1-tap FEQ).

To describe the method consider some notation: let $X(k)$ for $0 \leq k \leq N/2-1$ denote the complex sub-symbol (e.g., point of a QAM constellation) for tone k data which eventually will be transmitted. Extend the $X(k)$ by conjugate symmetry: $X(N-k)=X(k)^*$ for $1 \leq k \leq N/2-1$ (take $X(0)$ and $X(N/2)$ as both real), so the IFFT of the $X(k)$ yields N real $x(m)$ for $0 \leq m \leq N-1$ which can be viewed as samples of a transmitted time domain analog signal $x(t)$. The cyclic prefix adds P samples $x(N-P)$, $x(N-P+1)$, ..., $x(N-1)$ to the beginning of the N samples $x(0)$, $x(1)$, ..., $x(N-1)$ to form the (N+P)-sample block for serial modulation and transmission. For typical ADSL take N=512 and P=32.

Let $y(0)$, $y(1)$, ..., $y(N+P-1)$ be the (N+P) serially-received samples, so thus $y(n)=\Sigma h(m)x(n-P-m)$ where $h(n)$ is the transmission channel impulse response and $x(.)$ for negative index refers to either the cyclic prefix or preceding transmitted block (intersymbol interference). Consequently, the TEQ of length L+1 has the output $z(n)=\Sigma_{0 \leq m \leq L} w(m) y(n-m)$. Samples $z(0)$, $z(1)$, ..., $z(P-1)$ correspond to the cyclic prefix and are discarded; the N samples of interest are $z(P)$, $z(P+1)$, ..., $z(P+N-1)$. Denote by z the N-dimensional vector with components $z(P)$, $z(P+1)$, ..., $z(P+N-1)$ and denote by w the (L+1)-dimensional vector with components equal to the tap weights $w(j)$ of the TEQ. Then $z=Yw$ where Y is the $N \times (L+1)$ matrix with $(m,n)^{th}$ component equal to $y(P+m-n)$ where the rows are numbered $0 \leq m \leq N-1$ and the columns numbered $0 \leq n \leq L$. That is, $$z = \begin{bmatrix} z(P) \\ z(P+1) \\ \cdots \\ z(P+N-2) \\ z(P+N-1) \end{bmatrix}$$

$$w = \begin{bmatrix} w(0) \\ w(1) \\ \cdots \\ w(L-1) \\ w(L) \end{bmatrix}$$

$$Y = \begin{bmatrix} y(P) & y(P-1) & \cdots & y(P-L+1) & y(P-L) \\ y(P+1) & y(P) & \cdots & y(P-L+2) & y(P-L+1) \\ \cdots & \cdots & \cdots & \cdots & \cdots \\ y(P+N-2) & y(P+N-3) & \cdots & y(P+N-1-L) & y(P+N-2-L) \\ y(P+N-1) & y(P+N-2) & \cdots & y(P+N-L) & y(P+N-1-L) \end{bmatrix}$$

Denote the $N \times N$ DFT matrix as F; that is, $F(k,n)=e^{-j2\pi kn/N}$ for $0 \leq k,n \leq N-1$. Then apply the FFT to z to transform back to frequencies (tones) and multiply each tone by its FEQ weight ($g(k)$ for tone k), to thereby estimate the input sub-symbol $X(k)$, as:

$$X^{est}(k) = g(k) \sum_{0 \leq n \leq N-1} F(k,n) z(P+n)$$

$$= g(k) \sum_{0 \leq n \leq N-1} \sum_{0 \leq m \leq L} F(k,n) y(P+n-m) w(m)$$

$$= g(k) \sum_{0 \leq m \leq L} S(k,m) w(m)$$

where $S(k,m)$ is the sliding FFT of $y()$ defined as $$S(k,m) = \Sigma_{0 \leq n \leq N-1} F(k,n) y(P+n-m)$$

That is, for each m in the range $0 \leq m \leq L$, $S(k,m)$ is the $k^{th}$ tone of the DFT of the length-N sequence $y(P-m)$, $y(P-m+1)$, ..., $y(P-m+N-1)$, which is a slide-by-m back in time of the sequence $y(P)$, $y(P+1)$, ..., $y(P+N-1)$.

The foregoing can be written in matrix form as $X^{est}=GFYw=GSw$ where G is the diagonal matrix of FEQ elements $g(k)$. Let $f^T(k)$ be the kth row of F; then $s^T(k)=f^T(k)Y$ is an (L+1)-component vector of tone k of the sliding FFT of y.

The first preferred embodiment TEQ method maximizes the bit rate for a DMT system and/or receiver in line with the following explanation.

(a) Express the bit rate as $$R = \sum_k \log_2(1 + SNR(k))$$

$$= \log_2 \prod_k (1 + SNR(k))$$

$$\cong \log_2 \prod_k SNR(k)$$

where the sum and products are over the data-carrying tones k, and $SNR(k)$ is the signal-to-noise ratio for tone k. Received periodic DMT frames provide estimates for $SNR(k)$, and $SNR(k)$ determines whether tone k can be used for carrying data. And since the logarithm is a monotonically increasing function, maximizing the bit rate is equivalent to maximizing $\prod_k SNR(k)$.

(b) Presume that the transmitted power is the same for all tones during the training to determine the TEQ tap weights; then $SNR(k)$ for tone k is inversely proportional to $e(k)$, the mean square error (MSE) of the estimate for $X(k)$. In particular, using $w^T s(k) = s^T(k) w$, $e(k)$ is given by:

$$e(k) = E[|g(k) w^T s(k) - X(k)|^2]$$

$$= |g(k)|^2 w^T E[s(k) s^H(k)] w^* - g(k) w^T E[s(k) X(k)^*] -$$

$$g(k)^* E[s^H(k) X(k)] w^* + E[|X(k)|^2]$$

where $H$ denotes hermitian conjugate (transpose plus complex conjugate). Then maximizing the product of the $SNR(k)$s is equivalent to minimizing the product of the $e(k)$s. Of course, $E[s(k)s^H(k)]$, $E[s^H(k) X(k)]$, and $E[|X(k)|^2]$ are estimated during training sessions using known sequences of symbols $\{X(k)\}$.

(c) Minimize the product of the $e(k)$s first with respect to the FEQ $g(k)$s. Because $g(k)$ only appears in $e(m)$ for m=k, minimizing the product is the same as minimizing each $e(k)$ with respect to its $g(k)$. Thus solve for $g(k)$ such that $\partial e(k)/\partial g(k)=0$. The derivative of the real, positive $e(k)$ with respect to the complex $g(k)$ treats $e(k)$ as a function of the two independent complex variables $g(k)$ and $g(k)^*$, and thus $e(k)$ has simple derivatives:

$$\partial e(k)/\partial g(k) = g(k)^* w^T E[s(k) s^H(k)] w^* - w^T E[s(k) X(k)^*]$$

$$\partial e(k)/\partial g(k)^* = g(k) w^T E[s(k) s^H(k)] w^* - E[s^H(k) X(k)] w^*$$

Solving $\partial e(k)/\partial g(k)=0$ and $\partial e(k)/\partial g(k)^*=0$ yields, respectively:

$$g(k)^* = (w^T E[s(k)X(k)^*])/(w^T E[s(k)s^H(k)]w^*)$$

$$g(k) = (E[s^H(k)X(k)]w^*)/(w^T E[s(k)s^H(k)]w^*)$$

Of course, these two expressions are complex conjugates and there is only one complex solution. Substituting these $g(k)$ and $g(k)^*$ into $e(k)$ gives:

$$e_g(k) = S_X(k) - (w^T E[s(k)X(k)^*]E[s^H(k)X(k)]w^*)/(w^T E[s(k)s^H(k)]w^*)$$

$$= S_X(k) - (w^T M^{sX}(k)w^*)/(w^T M^{ss}(k)w^*)$$

$$= (w^T \{S_X(k)M^{ss}(k) - M^{sX}(k)\}w^*)/(w^T M^{ss}(k)w^*)$$

where the transmitted power in tone k, $E[|X(k)|^2]$, is denoted $S_X(k)$, and the $(L+1)\times(L+1)$ positive-definite matrices $M^{sX}(k)$ and $M^{ss}(k)$ are defined as:

$$M^{sX}(k) = E[s(k)X(k)^*]E[s^H(k)X(k)]$$

$$M^{ss}(k) = E[s(k)s^H(k)]$$

Note that $e_g(k)$ is homogeneous of order 0 in w, w*. In effect, the magnitude dependence has been extracted by the g(k)s and a constraint such as $\|w\|=1$ could be imposed.

Following section 3 considers the case of a real TEQ, and in such a case the positive definite matrices can effectively be replaced by their real parts.

(d) Determine the complex TEQ from $w_{opt}$ which minimizes the product of the foregoing $e_g(k)$s; that is, find the complex $w_{opt}$:

$$w_{opt} = \underset{w}{\operatorname{argmin}} \prod_k e_g(k)$$

$$= \underset{w}{\operatorname{argmin}} \prod_k [(w^T \{S_X(k)M^{ss}(k) - M^{sX}(k)\}w^*)/(w^T M^{ss}(k)w^*)]$$

Various multidimensional optimization methods may be used, such as Nelder and Mead simplex method, Powell's method, conjugate gradient methods, and so forth. These methods essentially require a good starting point, $w_{initial}$, and then converge to a global minimum, $w_{opt}$, by variation using the product. A good starting point is determined in following section 6 by finding an explicit solution for the case of a single tone. And the convergence to a global minimum can be stopped after a set number of iterations or when the error is less than a threshold, and the then-current approximate solution used to define the TEQ (and thus FEQ) tap weights.

Further, a starting point of a single-tone solution from section 6 can be expanded to select a set of single-tone solutions (such as every fifth tone) and then solve for the corresponding TEQs; then take the final TEQ from these candidate TEQs. For example, ADSL downstream may use tones 40–255. Thus apply section 6 to find single-tone solutions for tones 40, 45, 50, . . . , 80 and then use each of these nine single-tone solutions as a starting point and find the consequent nine TEQs. Pick the best of these nine TEQs as the TEQ for the receiver.

In summary, a training session in a DMT system transmits X(k)s with known powers and patterns so the receiver can measure received y(k)s and determine the elements of the matrices $M^{ss}$ and $M^{sX}$ and provide these as inputs for the w optimization problem. The computed w and g(k)s are then used to set the equalizer tap weights in the receiver. Of course, the w and g(k)s may be approximate solutions of the corresponding equations.

3. Real TEQ Optimization Preferred Embodiments

For a real TEQ (all of the tap weights w(j) are real numbers), the preferred embodiments follow the same steps as in the preceding complex TEQ description but with the real parts of the positive definite matrices. Indeed, for real w, $$w^T \{S_X(k)M^{ss}(k) - M^{sX}(k)\}w^* = \operatorname{Re}\{w^T\{S_X(k)M^{ss}(k) - M^{sX}(k)\}w^*\}$$

$$= w^T \operatorname{Re}\{S_X(k)M^{ss}(k) - M^{sX}(k)\}w$$

and $$w^T M^{ss}(k)w^* = \operatorname{Re}\{w^T M^{ss}(k)w^*\}$$

$$= w^T \operatorname{Re}\{M^{ss}(k)\}w$$

Thus define $e_{real-g}(k)$ as:

$$e_{real-g}(k) = (w^T \operatorname{Re}\{S_X(k)M^{ss}(k) - M^{sX}(k)\}w^*)/(w^T \operatorname{Re}\{M^{ss}(k)\}w^*)$$

Essentially, the positive definite matrices $M^{ss}(k)$ and $M^{sX}(k)$ have been replaced by their real parts, and $e_{real-g}(k)$ is defined for complex w.

Then find the real w which minimizes the product of the $e_{real-g}(k)$s and thereby define the real TEQ.

$$w_{real-opt} = \underset{realw}{\operatorname{argmin}} \prod_k e_{real-g}(k)$$

$$= \underset{realw}{\operatorname{argmin}} \prod_k [(w^T \operatorname{Re}\{S_X(k)M^{ss}(k) - M^{sX}(k)\}w)/(w^T \operatorname{Re}\{M^{ss}(k)\}w)]$$

Again, various multidimensional optimization methods may be used, such as Nelder and Mead simplex method, Powell's method, conjugate gradient methods, an so forth. These methods essentially require a good starting point, $w_{real-initial}$, and then converge to a minimum, $w_{real-opt}$, by variation using the product. Again, a good real starting point is determined in following section 6 by finding an explicit solution for the case of a single tone; and a set of good starting points may be used to find a set of candidate TEQs. A final TEQ is selected from this set of candidate TEQs.

4. Complex TEQ by Gradient Analysis Preferred Embodiments

Rather than directly computing the minimization as in the preceding sections, the minimization problem can be converted to a system of equations by noting that at the optimal w (and w*) the gradient of the product in the direction of the optimal $w^T$ and w* equals 0 (a column vector and a row vector, respectively). This provides simpler equations to solve for w in place of the optimization. Of course, the product of the $e_g(k)$s is homogeneous of order 0 in w, w* due to the optimization with respect to g(k), so the radial derivative with respect to $\|w\|$ is always 0 and a constraint such as $\|w\|=1$ may be imposed.

The derivative of the product with respect to $w^T$ is:

$$\partial(\Pi_m e_g(m))/\partial w^T = (\Pi_m e_g(m))(\Sigma_k (\partial e_g(k)/\partial w^T)/e_g(k))$$

Thus for the derivative of the product to vanish, the sum of the logarithmic derivatives must vanish, and so at the optimal w:

$$\Sigma_k((\partial e_g(k)/\partial w^T)/e_g(k))=0$$

Similarly for the w* derivative.

As seen in the foregoing, each $e_g(k)$ is of the form $w^T A w^*/w^T B w^*$ where $A=S_X(k)M^{ss}(k)-M^{sX}(k)$ and $B=M^{ss}(k)$. Thus $(\partial e_g(k)/\partial w^T)/e_g(k)$ is of the form $Aw^*/w^T A w^* - Bw^*/w^T B w^*$, and similarly $(\partial e_g(k)/\partial w^*)/e_g(k) = w^T A/w^T A w^* - w^T B/w^T B w^*$. Substituting these expressions for the derivatives into the preceding equations for the optimal w and w* yield:

$$0=\Sigma_k(\{S_X(k)M^{ss}(k)-M^{sX}(k)\}w^*)/(w^T\{S_X(k)\stackrel{\wedge}{M}{}^{ss}(k)-M^{sX}(k)\}w^*)-(M^{ss}(k)w^*)/(w^T M^{ss}(k)\ w^*)$$

$$0=\Sigma_k(w^T\{S_X(k)M^{ss}(k)-M^{sX}(k)\})/(w^T\{S_X(k)\stackrel{\wedge}{M}{}^{ss}(k)-M^{sX}(k)\}w^*)-(w^T M^{ss}(k))/(w^T M^{ss}(k)w^*)$$

Of course, the second set of equations is just the hermitian conjugate of the first set of equations, so there is only one independent set of equations. Note that the constraint $\|w\|=1$ avoids the trivial solution of $\|w\|\to\infty$.

These equations can be solved by numerical methods such as the Newton-Raphson multidimensional root finding method and Broyden's method. And as with the optimization methods, these numerical methods require a good starting point. So again use one or more a single-tone solutions from section 6 to generate one or more solutions, and take the best solution as the TEQ tap weights for the receiver.

5. Real TEQ by Gradient Analysis Preferred Embodiments

For a real w use $e_{real-g}(k)$ and solve the analogous directional derivative equations:

$$0=\Sigma_k(w^T Re\{S_X(k)\ M^{ss}(k)-M^{sX}(k)\})/(w^T Re\{S_X(k)\stackrel{\wedge}{M}{}^{ss}(k)-M^{sX}(k)\}w)-(w^T Re\{M^{ss}(k)\})/(w^T Re\{M^{ss}(k)\}w)$$

As with the complex w of section 4, these equations can be solved by numerical methods such as the Newton-Raphson multidimensional root finding method and Broyden's method to yield the tap weights of the TEQ. Again a good starting point is needed for the numerical methods, and following section 6 provides a good starting point. And again multiple starting points may be used to generate multiple candidate real TEQs, and then select the best of the candidates as the TEQ.

6. Single-Tone Preferred Embodiments

The preceding methods typically require a good starting point ($w_{initial}$ or $w_{real-initial}$) to converge to a global TEQ solution, $w_{opt}$ or $w_{real-opt}$. A preferred embodiment method finds a good starting point for the preceding methods by finding the optimal $w_{tonek-opt}$ or $w_{tonek-real-opt}$ for the case of only tone k being used and then taking $w_{initial}=w_{tonek-opt}$ or $w_{real-initial}=w_{tonek-real-opt}$. For the case of single tone k, the product to minimize is just a single e(k), and the minimization can be explicitly performed. In particular, the preferred embodiments first optimize with respect to w and then solve for g(k).

(a) For a complex w the g(k) could be absorbed into w and there is a simple solution:

$$e(k)=g(k)\ w^T E[s(k)s^H(k)]g(k)^* w^* - g(k)\ w^T E[s(k)X(k)^*] - E[s^H(k)\ X(k)]g(k)^* w^* + E[|X(k)|^2]$$

Differentiating with respect to $w^T$ yields:

$$\partial e(k)/\partial w^T = g(k)\ E[s(k)s^H(k)]g(k)^* w^* - g(k)\ E[s(k)\ X(k)^*]$$

Thus requiring $\partial e(k)/\partial w^T=0$ implies $$g(k)^* w_{tonek-opt}^* = E[s(k)s^H(k)]^{-1}\ E[s(k)\ X(k)^*]$$

This gives the product $g(k)w_{tonek-opt}$ which determines the TEQ and FEQ up to reciprocal factors. Of course, requiring $\|w\|=1$ determines the TEQ and FEQ up to a phase, and g(k) could be taken as real.

Differentiating with respect to w* leads to the same solution.

Note that substituting these expressions for $w^T$ and w* back into the equation for e(k) gives the minimal value as:

$$\begin{aligned}e_{tonek-\min}(k) = &\ E[s(k)s^H(k)]^{-1} E[s^H(k)X(k)]E[s(k)X(k)^*] - \\ &\ E[s(k)s^H(k)]^{-1} E[s^H(k)X(k)]E[s(k)X(k)^*] - \\ &\ E[s^H(k)X(k)]E[s(k)s^H(k)]^{-1} E[s(k)X(k)^*] + \\ &\ E[|X(k)|^2] \\ = &\ E[|X(k)|^2] - E[s^H(k)X(k)]E[s(k)s^H(k)]^{-1} E[s(k)X(k)^*]\end{aligned}$$

The smallest value of $e_{tonek-min}(k)$ could be used to select among ks to determine which $w_{tonek-opt}$ should be the starting point, or, as previously noted, a set of ks with small $e_{tonek-min}(k)$s could be used to generate a set of candidate TEQs from which the final TEQ is selected.

(b) For a real w, use $e_{real}(k)$:

$$e_{real}(k)=|g(k)|^2\ w^T Re\{E[s(k)s^H(k)]\}w - w^T Re\{g(k)\ E[s(k)\ X(k)^*]\} - Re\{g(k)^* E[s^H(k)\ X(k)]\}w + E[|X(k)|^2]$$

Then minimizing $e_{real}(k)$ for real w proceeds as previously by differentiating with respect to $w^T$.

$$\partial e_{real}(k)/\partial w^T = |g(k)|^2\ Re\{E[s(k)s^H(k)]\}w - Re\{g(k)\ E[s(k)\ X(k)^*]\}$$

Thus requiring $\partial e_r(k)/\partial w^T=0$ implies:

$$|g(k)|^2 w = Re\{E[s(k)s^H(k)]\}^{-1}\ Re\{g(k)\ E[s(k)\ X(k)^*]\}$$

Note that the equation only depends upon the product of the magnitudes $|g(k)|$ and $\|w\|$ rather than the magnitudes separately. Thus the constraint $|g(k)|=1$ can be imposed so the magnitude appears in w. Substituting this w back into $e_{real}(k)$ yields:

$$\begin{aligned}e_{real-w}(k) = &\ E[|X(k)|^2] - Re\{g(k)E[s^T(k)X(k)^*]\} \\ &\ Re\{E[s(k)s^H(k)]\}^{-1} Re\{g(k)E[s(k)X(k)^*]\} \\ = &\ S_X(k) - Re\{g(k)E[s^T(k)X(k)^*]\} \\ &\ Re\{M^{ss}(k)\}^{-1} Re\{g(k)E[s(k)X(k)^*]\}\end{aligned}$$

Because $|g(k)|=1$, write $g(k)$ as $e^{j\theta}$ and use the definition of real part:

$$2\text{Re}\{g(k)E[s(k)X(k)^*]\} = 2\text{Re}\{e^{j\theta}E[s(k)X(k)^*]\}$$
$$= e^{j\theta}E[s(k)X(k)^*] + e^{-j\theta}E[s^*(k)X(k)]$$

and $$2\text{Re}\{g(k)E[s^T(k)X(k)^*]\} = 2\text{Re}\{e^{j\theta}E[s^T(k)X(k)^*]\}$$
$$= e^{j\theta}E[s^T(k)X(k)^*] + e^{-j\theta}E[s^{T*}(k)X(k)]$$

Thus $$4(S_x(k) - e_{real-w}(k)) = e^{j2\theta}E[s^T(k)X(k)^*]\text{Re}\{M^{ss}(k)\}^{-1}E[s(k)X(k)^*] +$$
$$e^{-j2\theta}E[s^{T*}(k)X(k)]\text{Re}\{M^{ss}(k)\}^{-1}E[s^*(k)X(k)] +$$
$$E[s^T(k)X(k)^*]\text{Re}\{M^{ss}(k)\}^{-1}E[s^*(k)X(k)] +$$
$$E[s^{T*}(k)X(k)]\text{Re}\{M^{ss}(k)\}^{-1}E[s(k)X(k)^*]$$

Minimize $e_{real-w}(k)$ by differentiate with respect to $\theta$ and set the derivative equal to 0. This yields $$g(k)^4 = e^{j4\theta}$$
$$= E[s^{T*}(k)X(k)]\text{Re}\{M^{ss}(k)\}^{-1}E[s^*(k)X(k)] /$$
$$E[s^T(k)X(k)^*]\text{Re}\{M^{ss}(k)\}^{-1}E[s(k)X(k)^*]$$

This defines $g(k)$ and thus the corresponding $w_{tonek-real-opt}$ from the foregoing expression $$w = \text{Re}\{E[s(k)s^H(k)]\}^{-1} \text{Re}\{g(k) E[s(k) X(k)^*]\}$$

Alternatively, for a real $w$ find the optimal $g(k)$ subject to the constraint $|g(k)|=1$ by Lagrange multipliers. That is, minimize $e_{real-w}(k) + \lambda(g(k)g(k)^* - 1)$ by differentiating with respect to $g(k)$ and $\lambda$, and setting the derivative equal to 0 to solve for $g(k)$ and $\lambda$. First simplify notation:

$$e_{real-w}(k) + \lambda(g(k)g(k)^* - 1) = S_x(k) - \text{Re}\{g(k)E[s^T(k) \times (k)^*]\}$$
$$\text{Re}\{M^{ss}(k)\}^{-1}\text{Re}\{g(k)E[s(k)X(k)^*]\} +$$
$$\lambda(g(k)g(k)^* - 1)$$
$$= S_x(k) - \text{Re}\{g(k)a^T\}\text{Re}\{g(k)b\} +$$
$$\lambda(g(k)g(k)^* - 1)$$
$$= S_x(k) - (g_r a_r^T - g_i a_i^T)(g_r b_r - g_i b_i) +$$
$$\lambda(g_r^2 + g_i^2 - 1)$$
$$= S_x(k) + (\lambda - a_r^T b_r)g_r^2 +$$
$$(a_r^T b_i + a_i^T b_r)g_r g_i + (\lambda - a_i^T b_i)g_i^2 - \lambda$$

where $a^T = E[s^T(k) X(k)^*]\text{Re}\{M^{ss}(k)\}^{-1}$ and $b = E[s(k) X(k)^*]$, so $a$ and $b$ are complex $(L+1)$-dimensional vectors, $g_r$ and $g_i$ are the real and imaginary parts of $g(k)$, $a_r$ and $a_i$ are the real and imaginary parts of $a$, and $b_r$ and $b_i$ are the real and imaginary parts of $b$.

Then differentiating with respect to each of the three real variables $\lambda$, $g_r$, and $g_i$ and setting the derivatives equal to 0 yields three equations for the optimal $g(k)$ and $\lambda$:

$$g_r^2 + g_i^2 - 1 = 0$$
$$2g_r(\lambda - a_r^T b_r) + g_i(a_r^T b_i + a_i^T b_r) = 0$$
$$2g_i(\lambda - a_i^T b_i) + g_r(a_r^T b_i + a_i^T b_r) = 0$$

Now let the ratio $g_r/g_i = r$, then the first equation implies $g_r = r/\sqrt{(1+r^2)}$ and $g_i = 1/\sqrt{(1+r^2)}$, and the other two equations, after dividing by $g_i$, become:

$$2r(\lambda - a_r^T b_r) + (a_r^T b_i + a_i^T b_r) = 0$$
$$2(\lambda - a_i^T b_i) + r(a_r^T b_i + a_i^T b_r) = 0$$

Solve the second equation for $\lambda$ and substitute into the first equation:

$$\lambda = a_i^T b_i - r(a_r^T b_i + a_i^T b_r)/2$$
$$2r(a_i^T b_i - r(a_r^T b_i + a_i^T b_r)/2 - a_r^T b_r) + (a_r^T b_i + a_i^T b_r) = 0$$

This last equation is of the form $r^2 + 2Ar - 1 = 0$ where $A = (a_r^T b_r - a_i^T b_i)/(a_r^T b_i + a_i^T b_r) = \text{Re}\{a^T b\}/\text{Im}\{a^T b\}$, and has solution $r = -A \pm \sqrt{(1+A^2)}$. This then defines $g(k)$ and thus $w$ for the single-tone TEQ.

7. Modifications

The preferred embodiments may be varied while retaining the feature of TEQ determination from a single-tone starting point.

For example, the minimization of the product of mean square errors may be finding an approximation of the exact minimum such as using only a finite number of iterations in an iterative method; only a subset of the tones may be used for equalizer determination; a training sequence (for auto- and cross-correlation estimation) may use unequal power among the tones; as so forth.

What is claimed is:

1. A method of equalizer determination, comprising:
providing estimates of correlations of received multitone signals;
determining a set of tap weights for a time domain equalizer from a minimization of the product of tone mean square errors of said muititone signals using said estimates;
wherein said minimization includes a multivariable optimization starting at an initial set of tap weights for a time domain equalizer, said initial set of tap weights corresponding to an equalizer for a single tone and determining for each of said tones a 1-tap frequency domain equalizer.

2. A method equalizer determination, wherein:
providing estimates of correlations of received multitone signals; and
determining a set of tar weights for a time domain equalizer from a minimization of the product of tone mean square errors of said multitone signais using said estimates by determining a plurality of candidate sets of tap weights and selection from said plurality;
wherein said minimization includes a multivariable optimization starting at an initial set of tap weights for a time domain equalizer, said initial set of tap weights corresronding to an equalizer for a single tone.

3. The method of claim 1 or 2, wherein:
said multitone signals are represented as complex numbers; and
said tap weights are real numbers.

4. The method of claim 1 or 2, wherein:

said multitone signals are represented as complex numbers; and said set of tap weights forms a vector with complex magnitude equal to 1.

5. The method of claim 1 or 2, wherein:

said determining a set of tap weights includes finding an at least approximate solution w of a vector equation of the form $$\Sigma_k(w^T A_k/w^T A_k w^* - w^T B_k/w^T B_k w^*) = 0$$

where the at least approximate solution has components determining said tap weights.

6. The method of claim 5, wherein:

said at least approximate solution w has real components.

7. The method of claim 1 or 2, wherein:

said determining a set of tap weights includes finding an at least approximate solution w of a vector equation of the form $$\Sigma_k(A_k w^*/w^T A_k w^* - B_k w^*/w^T B_k w^*) = 0$$

where the at least approximate solution has components determining said tap weights.

8. The method of claim 7, wherein:

said at least approximate solution w has real components.

9. The method of claim 1 or 2, wherein:

said minimization includes selecting from two or more of said multivariable optimizations, said multivariable optimizations with differing initial sets of tap weights corresponding to differing equalizers for differing single tones.

10. A multitone receiver, comprising:

a time domain equalizer;

a block transformer coupled to an output of said time domain equalizer; and a plurality of 1-tap frequency domain equalizers, each of said frequency domain equalizers coupled to an output of said block transformer;

wherein said time domain equalizer has tap weights characterized by a minimization of the product of tone mean square errors of outputs of said frequency domain equalizers, wherein said minimization includes a multivariable optimization starting at an initial set of tap weights for said time domain equalizer, said initial set of tap weights corresponding to an equalizer for a single tone.

* * * * *